(Model.)  5 Sheets—Sheet 1.
T. B. JACKSON & M. P. LYTTON.
COAL DUMP.
No. 371,890. Patented Oct. 18, 1887.
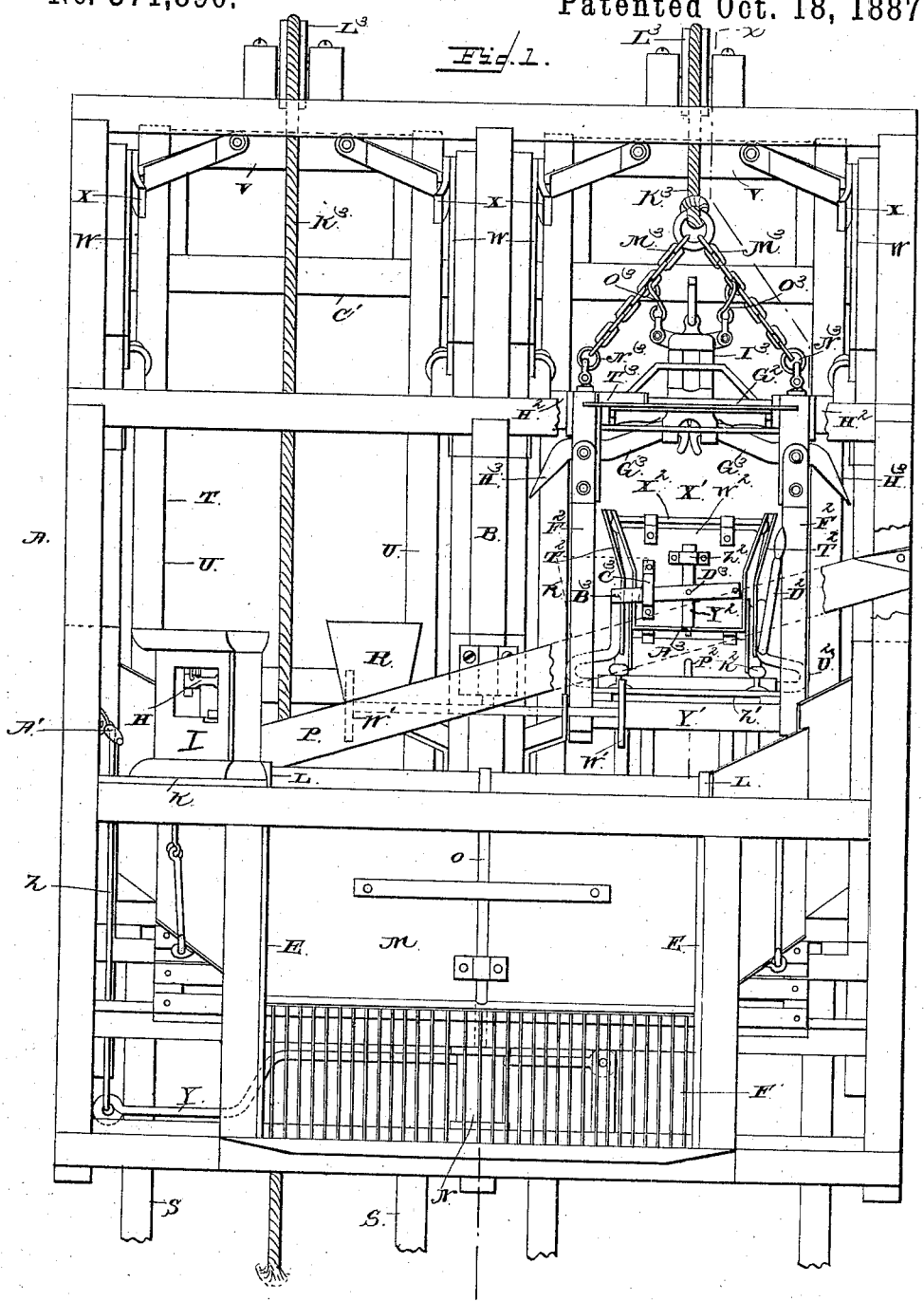
Witnesses
M. E. Fowler
J. W. Garner
Inventors
Thomas B. Jackson
M. P. Lytton
By their Attorneys,

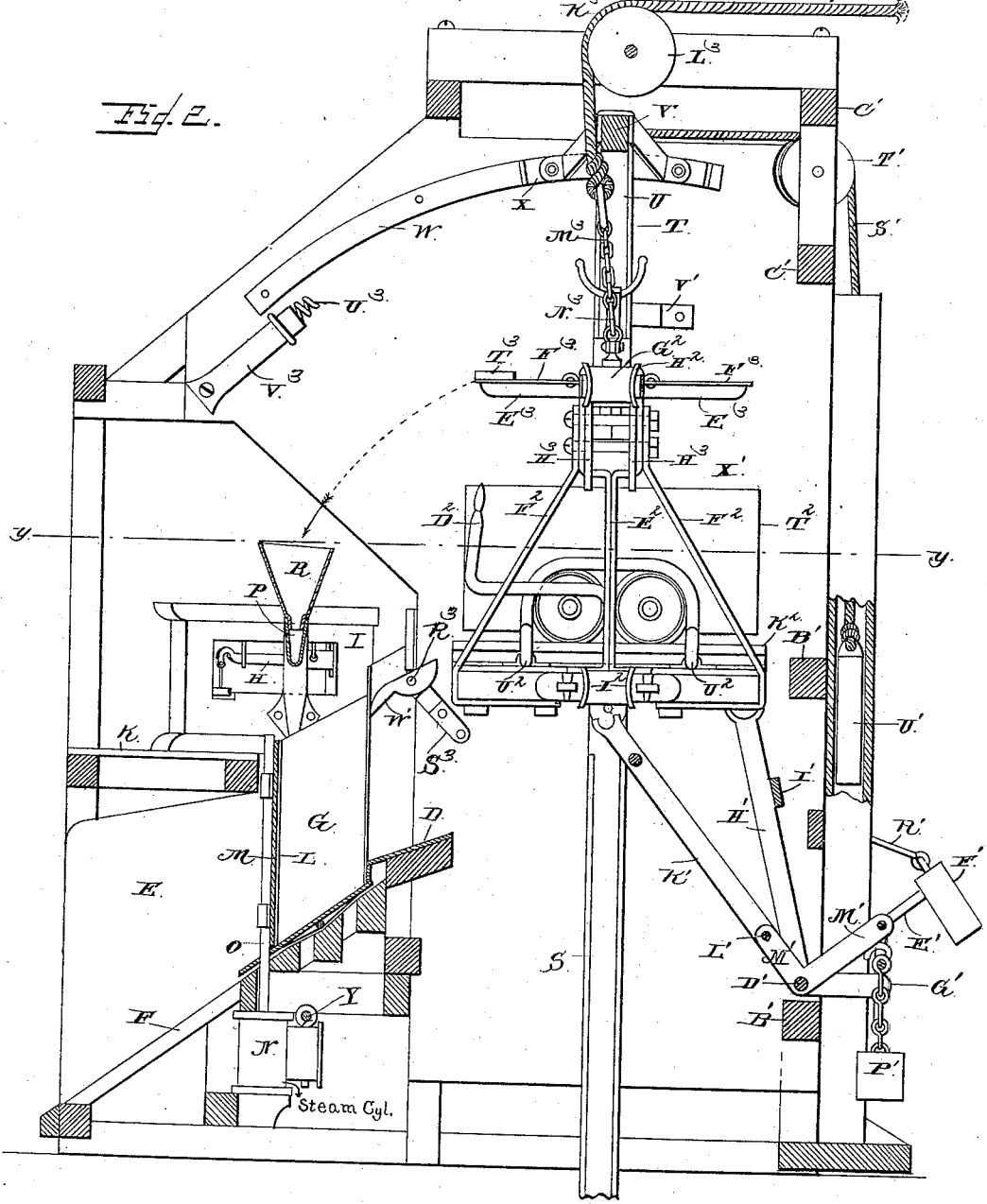

(Model.) 5 Sheets—Sheet 3.
T. B. JACKSON & M. P. LYTTON.
COAL DUMP.
No. 371,890. Patented Oct. 18, 1887.
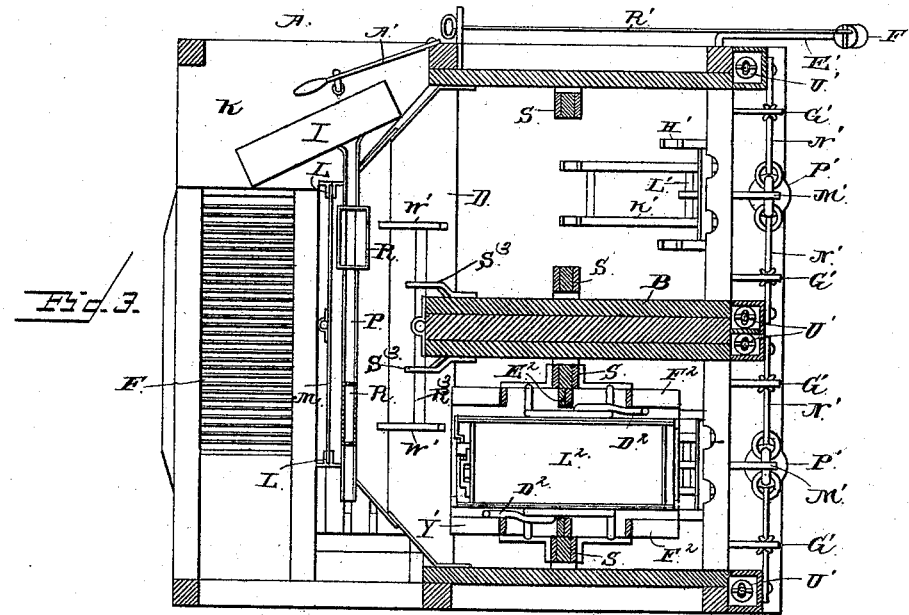
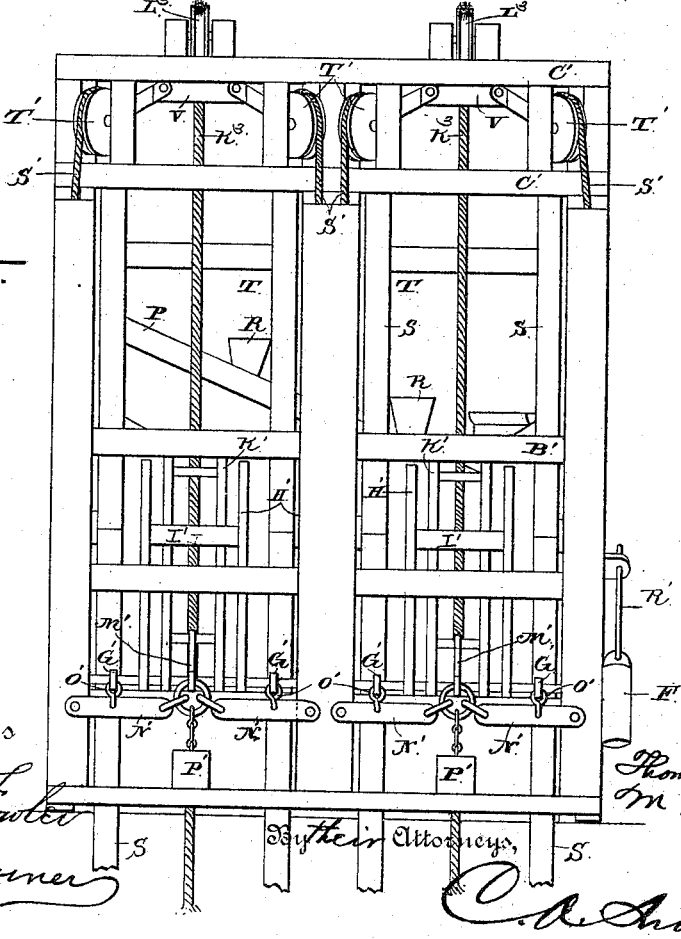
Witnesses
M. Fowler
J. W. Garner
Inventors
Thomas B. Jackson
M. P. Lytton
By their Attorneys (Model.)
5 Sheets—Sheet 4.
T. B. JACKSON & M. P. LYTTON.
COAL DUMP.
No. 371,890. Patented Oct. 18, 1887.
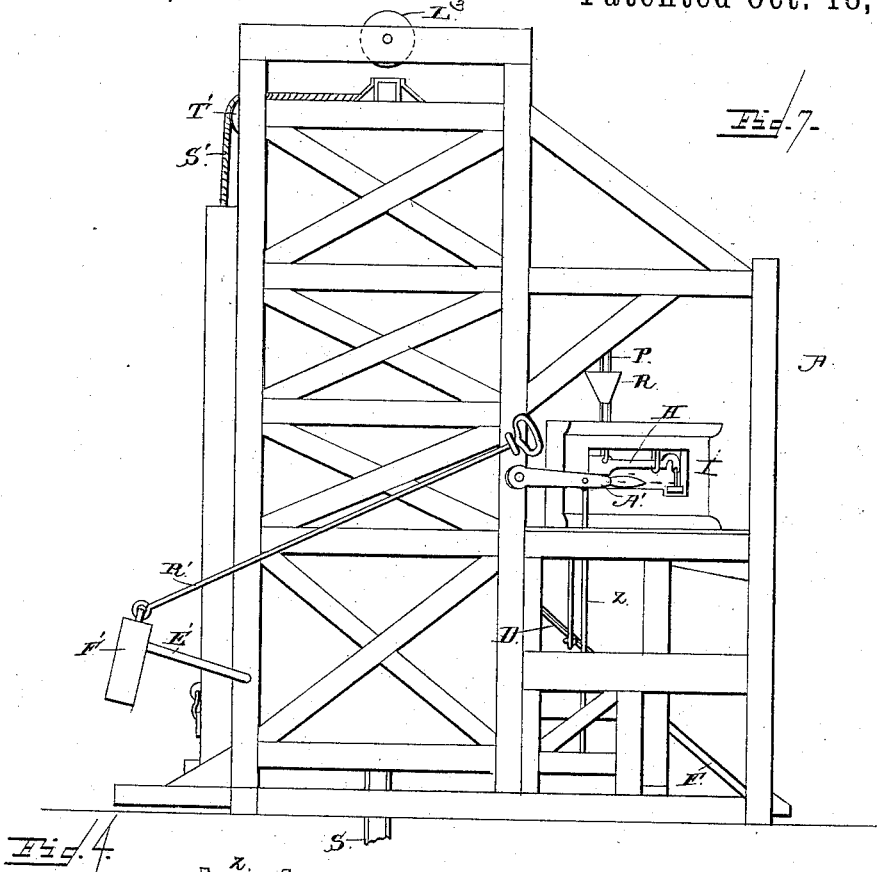
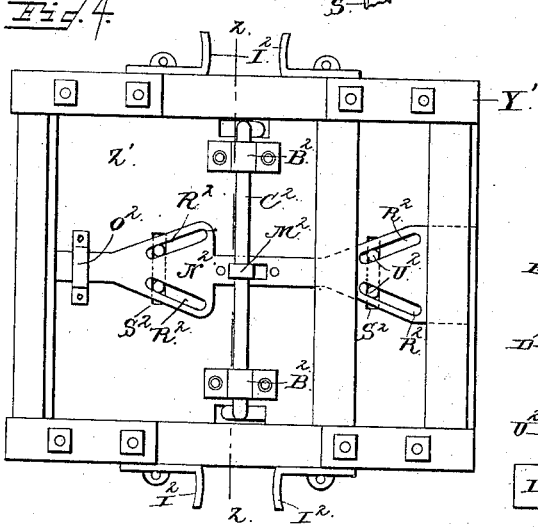
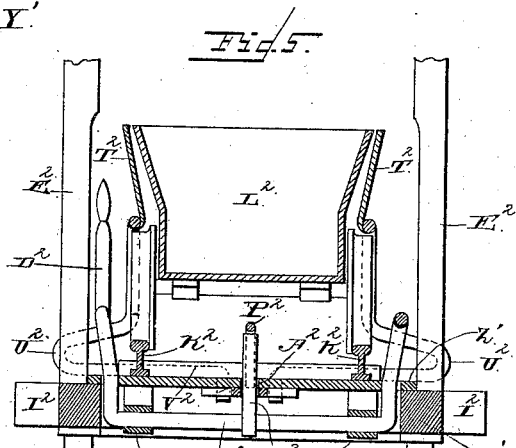
Witnesses
M. Fowler
J. W. Garner
Inventors
Thomas B. Jackson
M. P. Lytton
By their Attorneys, (Model.)
5 Sheets—Sheet 5.
T. B. JACKSON & M. P. LYTTON.
COAL DUMP.
No. 371,890. Patented Oct. 18, 1887.
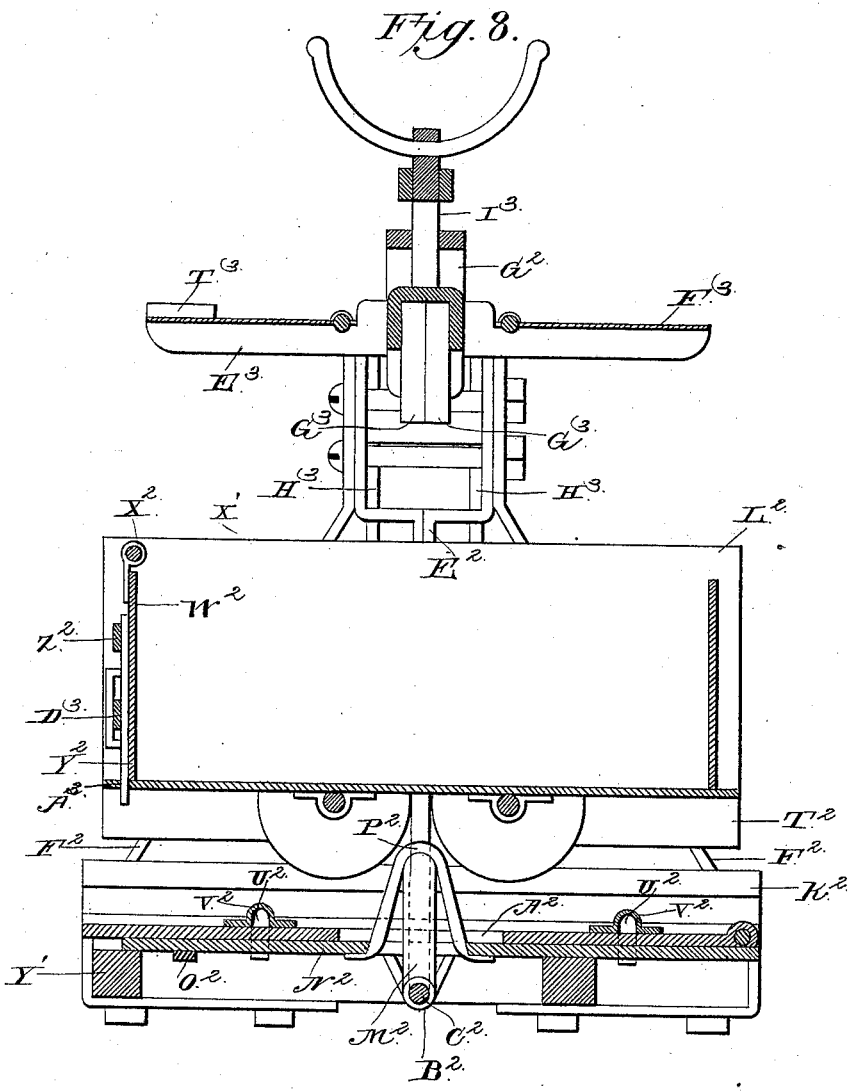
Witnesses
M. E. Fowler
J. W. Garner
Inventors
Thos. B. Jackson and
M. P. Lytton
By their Attorneys

UNITED STATES PATENT OFFICE.

THOMAS BENTON JACKSON AND MARSHALL PIERCE LYTTON, OF MACON CITY, MISSOURI.

COAL-DUMP.

SPECIFICATION forming part of Letters Patent No. 371,890, dated October 18, 1887.

Application filed April 11, 1887. Serial No. 234,462. (Model.)

*To all whom it may concern:*

Be it known that we, THOMAS BENTON JACKSON and MARSHALL PIERCE LYTTON, citizens of the United States, residing at Macon City, in the county of Macon and State of Missouri, have invented a new and useful Improvement in Automatic Coal-Dumps and Pit-Heads, of which the following is a specification.

Our invention relates to an improvement in automatic coal-dumps and pit-heads; and it consists in the peculiar construction and combination of devices, that will be more fully set forth hereinafter, and particularly pointed out in the claims.

In the drawings, Figure 1 is a front elevation of a combined coal-dump and pit-head embodying our improvements. Fig. 2 is a vertical sectional view of the same, taken on the line *x x* of Fig. 1. Fig. 3 is a horizontal section taken on the line *y y* of Fig. 2. Fig. 4 is an inverted plan view of one of the cages. Fig. 5 is a vertical transverse sectional view of the same, taken on the line *z z* of Fig. 4. Fig. 6 is a rear elevation of our improved pit-head and coal-dump. Fig. 7 is an end elevation of the same. Fig. 8 is a vertical central longitudinal sectional view of one of the elevating-cages.

A represents a vertical frame, which forms the pit-head and is erected at the mouth of the pit or vertical shaft. The rear portion of the pit-head is divided by a vertical central partition, B, into two vertical compartments of equal size. On the front side of the pit-head, at the base thereof, is a chute, D, having a vertical side, E, and the inclined bottom F, which is made of parallel bars having suitable spaces between them, and thereby forming a screen. At the upper side of the said screen is a hopper, G, the bottom of which is inclined at an angle corresponding to the inclination of the screen, and the upper edge of the bottom of the hopper communicates with the vertical compartments in the pit-head. The hopper G forms the platform or pan of a weighing-scales, the beam H of which is suspended in a frame, I, that is erected on a platform, K, built at one corner of the pit-head, at the front side thereof. The sides of the hopper are provided at their front edges with vertical guideways L, in which are secured the ends of a vertically-movable slide, M.

N represents a vertical steam-cylinder, which is located under the center of the hopper, at the front side thereof, and in the said steam-cylinder is a piston, which is provided with a vertical piston-rod, O, that extends up through an opening in the bottom of the hopper and is connected to the front side of the slide. This cylinder is connected to a steam-boiler, (not shown,) and by admitting steam to the cylinder under the piston the latter is forced to rise, and thereby elevate the slide N and discharge the contents of the hopper onto the screen F.

P represents an inclined trough, which is supported in the front side of the pit-head and extends downwardly to a point on the platform K near the scale-frame I.

R represents a pair of hoppers, each of which is connected to the upper side of the inclined trough, and the openings in the lower sides of the said hoppers communicate with the said trough. One of these hoppers is located in front of each vertical compartment of the pit-head.

S represents vertical guide-tracks, which extend upwardly in the pit or shaft, and the upper portions of the said guide-tracks are secured against opposite sides of the vertical compartments in the pit-head. The said guide-tracks terminate in the said compartments of the pit-head at a point slightly higher than the rear upper edge of the inclined bottom of the hopper G.

In each compartment of the pit-head is located a rocking guide-frame, T. The said guide-frame comprises a pair of guide track-rails, U, and a cross-bar, V, which connects the upper ends of the rails. The lower ends of the said rails are pivoted in the upper ends of the vertical rails S, and thereby the guide-frames are adapted to swing forward toward the front side of the pit-head.

On opposite sides of the vertical compartments of the pit-head are secured curved bearing-plates W, which describe segments of circles drawn from the pivotal points of the guide-frames T. The latter are provided at their upper ends on their outer sides with shoes X, that bear against opposing sides of the curved plates W.

Y represents a lever, which is pivoted at one end to a post or standard under the bottom of the hopper. The outer end of the said lever extends to a point under the platform K, and from the free end of the lever projects a vertical connecting-rod, Z, the upper end of which is connected to a hand-lever, A′, that is pivoted to one side of the pit-head, near the scale-beam. This lever Y is connected to the valve that admits steam to the cylinder M, and is operated by the "weigh-boss," who is stationed upon the platform K. On the rear sides of the vertical compartments of the pit-head are horizontal beams B′, and at a suitable distance above the same are similar beams, C′.

D′ represents a horizontal rock-shaft, which is journaled in the sides and central partition of the pit-head, and is arranged above the beam B′. One end of this rock-shaft is provided with a crank-arm, E′, from which is suspended a weight, F′.

G′ represents a pair of lever-arms, which are secured to the rock-shaft D′ and project rearwardly therefrom in each compartment of the pit-head, the said pairs of lever-arms being arranged at suitable distances apart.

H′ represents a pair of vertical rocking arms, which are attached rigidly to the rock-shaft D′ and are arranged in the rear side of each compartment of the pit-head. The said rocking arms H′ are connected together in pairs by cross-bars I′.

K′ represents two pairs of rocking arms, which are pivoted at their lower ends to the rock-shaft D′ and are arranged between the rock-arms H′. Each pair of the arms K′ is connected by a bar, L′, which is arranged at a suitable distance above the rock-shaft D′.

M′ represents a right-angled lever, which is fulcrumed on the rock-shaft D′, midway between each pair of arms K′. The upper ends of the levers M′ are connected to the cross-bars L′, and the rearward-projecting arms of the said levers are connected to the inner ends of pivoted arms N′, which are arranged on the rear side of a pit-head and extend toward each other. The said arms N′ are connected to the arms G′ of the rock-shaft by means of links O′, and weights P′ are suspended from the links which connect the inner ends of the arms N′ and the rear arms of the levers M′, the function of the said weights being to draw the rock-arms K′ and H′ rearwardly in a vertical position against the front side of the bar B′ out of the path of the cage.

R′ represents a trip-rod, which is connected to the crank-arm E′ of the rock-shaft, and the said trip-rod is guided in keepers on one side of the pit-head and extends to a point within easy reach of the weigh-boss on the platform A, and has a loop or handle formed at its inner end, by means of which it may be readily grasped.

S′ represents ropes or chains, which are connected to the upper ends of the guide-frames T and pass rearward over suitable guiding-sheaves T′, which are journaled in the upper rear sides of the pit-head and depend from the rear sides of the said guiding-sheaves, and are provided with weights U′, the function of which is to normally move the guiding-frames T rearward to nearly a vertical position.

V′ represents stops, which are secured on the opposing sides of the compartments of the pit-head, and against which the rear sides of the frames T strike, the said stops serving to support the said frames in the slightly forwardly-inclined position indicated in Fig. 2.

W′ represents a pair of inclined tappet-arms, which are rigidly connected to horizontal rod $R^3$, supported in the front sides of the compartments of the pit-head at a suitable height above hopper G by arms $S^3$, which are secured to opposite sides of the partition between the said compartments.

X′ represents a pair of cages or hoists, each of which is adapted to travel vertically on one of the vertical guiding-tracks S in the pit or shaft. As the said cages are similar in construction, we will only describe one of them.

Y′ represents the rectangular horizontal frame which forms the base of the cage.

Z′ represents a platform, which is arranged on the upper side of the base, and is pivoted thereto at its front end, as at Fig. 8, whereby the platform is adapted to be tilted or inclined. In the center of the platform is a longitudinal slot, $A^2$, and on the under side of the said platform, near opposite edges thereof, are secured depending arms or brackets $B^2$, in the lower ends of which is journaled a transverse rock-shaft $C^2$. The ends of the rock-shaft are upturned to form levers $D^2$, which are bent and thereby caused to extend toward opposite ends of the cage. From opposite sides of the base-frame, at the center thereof, project vertical standards $E^2$, which are braced by means of inclined brace-rods $F^2$, the upper ends of which are bolted to the upper ends of the standards, and the lower ends of which are secured under the ends of the base-frame, as shown.

$G^2$ represents a cross-bar, which connects the upper ends of the standards, and from the ends of the said cross-bar project two pairs of ears, $H^2$. The said ears bear against opposite sides of the track or guide rails S and guide the cage vertically between the said guide or track rails. From opposite sides of the base-frame of the cage, at the center thereof, project two pairs of guiding-ears, $I^2$, which also bear against opposite sides of the track or guide rails S.

$K^2$ represents a pair of track-rails, which are secured on the upper side of the platform, and are adapted to align with the track in the gallery of the mine when the cage is lowered to the foot of the shaft, so that a loaded car, $L^2$, may be run upon the cage.

From the center of the rock-shaft $C^2$ projects a vertical arm, M², that extends upward and works in the longitudinal slot made in the platform of the cage.

N² represents a longitudinal slide-bar, which is secured on the under side of the platform and is guided in keepers O². The said slide-bar has a vertical yoke, P², which projects from its upper side and extends through and is adapted to work longitudinally in the longitudinal slot in the platform of the cage, and the tappet-arm M² is adapted to operate the said yoke so as to move the slide-bar longitudinally when the rock-shaft is turned. The slide-bar N² is provided near its ends with diverging oblique slots R². The platform of the cage is provided at a suitable distance from its ends with the transverse slots S², which intersect and communicate with the oblique slots in the slide bar.

T² represents vertical sides provided for the cage, and having at their lower ends supporting-bars U², which are bent at right angles and extend toward each other and are guided in keepers V² on the platform of the cage. The inner ends of the said rods U² are bent downwardly in a vertical position and extend through the slots S² in the platform of the cage and enter the oblique slots in the slide-bar N².

From the foregoing description it will be readily understood that when the rock-shaft C² is partly rotated in one direction by means of its levers the slide-bar will be moved endwise, and thereby cause the oblique slots to draw upon the downturned ends of the rods U², and consequently draw the sides T² toward each other, so as to force the said sides firmly against opposite sides of the car, and thereby prevent the coal or ores in the car from accidentally running over the sides thereof. Openings are made in the lower edges of the sides T², to permit the latter to clear the wheels of the car. When the said sides T² are thus clamped against opposite sides of the car, the latter is firmly secured in position on the platform and cannot run off the track and become disengaged from the cage. When the rock-shaft C² is turned in the contrary direction, the sides T² move outwardly from each other, and thereby release their hold upon the car.

The car L² is provided at one end with an end-gate, W², the upper edge of which is pivoted on a horizontal rod, X², that connects the upper edges of the sides of the car. The lower edge of the said end-gate is thereby adapted to to swing outwardly, as will be readily understood.

Y² represents a vertically-movable locking-bolt, which is guided in a keeper, Z², on the front side of the end-gate, and the lower end of the said locking-bolt is reduced in size to form a projection adapted to enter an opening, A³, made in the bottom of the car.

B³ represents an operating-lever, which has one end pivoted to the end-gate. The said lever projects beyond the opposite side of the end-gate and beyond one side of the car, and has its free end guided by a keeper, C³. This lever is connected to the bolt Z² by means of a pivotal pin, D³.

To the upper ends of the vertical standards of the cage, on the inner sides thereof, are secured a pair of longitudinal horizontal bars, E³, which project from the standards in opposite directions.

F³ represents a pair of bonnets or covers, which are supported upon the bars E³ and have their inner edges pivoted to ears formed on the upper side of the said bars, as shown. These bonnets or covers serve as a shield to protect the person who may be ascending or descending the shaft from injury by a falling lump of coal or other object which may be dropped in the shaft.

G³ represents a pair of locking-arms, which are pivoted in the upper ends of the standards E². The inner ends of the said locking-arms extend toward each other, and are curved or rounded at their points of contact to permit them to be moved upwardly. The outer ends of the said locking-arms are provided with downwardly-inclined engaging-points H³, which project outwardly beyond the sides of the cage and are adapted to engage the sides of the shaft when the inner ends of the arms G³ are lowered.

I³ represents a vertically-movable link, which has its lower end connected to the inner ends of the arms G³, and the said link extends upward through openings made in the cross-bar G².

K³ represents the elevating rope or chain, which passes over a guiding-sheave, L³, journaled at the upper side of the pit-head, and is attached to a winding drum or hoist operated by a steam-engine (not shown) in the usual manner. To the lower end of the elevating rope or chain are attached chains M³, which are connected to rings N³, secured to the upper ends of the standards of the cage.

O³ represents chains, which connect the link I³ with the chains M³, and when the latter are tightened raise the link I³, so as to elevate the inner ends of the arms G³, and thereby withdraw the engaging-points H³ from contact with the sides of the shaft.

U³ represents coiled buffer-springs, which are arranged in sheathes or cases V³, secured to the opposing sides of the compartments of the pit-head, near the front side thereof. These springs receive the impact of the tilting frames T when the latter move forward to discharge the coal into hopper G.

The operation of our invention is as follows: When a car loaded with coal is run on the cage at the foot of the shaft and is secured thereon by moving the sides T² against opposite sides of the car, as previously described, the check or tally inscribed with the name or number of the miner who mined the coal is placed in a receptacle, T³, at the front corner of one of the bonnets or covers F³, and the cage is then hoisted in the shaft. When the cage reaches the upper end of the track or guide S, it runs onto the swinging frame T, and when it reaches the upper end of the said swinging frame the engineer stops the engine and slackens the elevating-rope. At this instant the weigh-boss grasps the handle of the rod R' and moves the same forwardly, thereby partly turning the rock-shaft D' by means of the crank-arm E', to which the rod is connected. As the rock-shaft turns, the arms H', which are rigidly connected thereto, incline forward, and the bars I', which connect the said arms, strike against the rear sides of the pivoted arms K', and thereby tilt the latter forward also. As the rock-shaft turns, its arms G' raise the inner ends of the levers N' and the weights P' and permit the bell-crank levers M' to tilt also. The upper bifurcated ends of the arms K' move into the path of the rock-shaft under the pivoted bottom of the cage, and the bifurcated upper ends of the arms H' move into the path of the rear end of the cage. As the rope slackens, the cage descends. A depending flange at the rear end of its bottom strikes upon the upper bifurcated ends of the arms H', thereby causing the bottom of the cage to be inclined, and the rock-shaft under the center of the cage engages the upper bifurcated ends of the arms K'. The weight of the cage and the loaded car thereon causes the arms K' and H' to exert considerable pressure against the rear side of the frame T, as will be readily understood, and the said frame, being pivoted at its lower end, is thereby caused to tilt forward over the bottom of the hopper. As the frame T moves forward, the free end of the arm B³, which operates the bolt Z², comes in contact with the inclined tappet-arm W', and thereby the said lever is raised, thus elevating the bolt and unlocking the end-gate, and the coal in the car is discharged onto the bottom of the hopper.

It will be observed by reference to Fig. 2 that the corner of the bonnet or cover having the receptacle T³ comes over the hopper R in the inclined spout or trough P, and consequently at the same instant the coal is discharged from the car, the miner's check or tally is dropped into the hopper R, and from the latter descends into the trough P, and is conveyed by the same to the platform K and to the weigh-boss. The latter ascertains the weight of the coal discharged into the hopper by means of the scales and raises the free end of the connecting-rod Z, thereby operating the lever Y and causing steam to be admitted to the cylinder M and force the piston in the said cylinder upward and raises the slide N, so as to discharge the coal in the hopper over the inclined screen F and into a car or other suitable receptacle located below the screen. As soon as the coal is discharged from the car, the engineer reverses the engine, causing the latter to turn the frame T backward to its initial position, and, raising the cage from the rock-arms H' and K', the weight attached to the arms M', connected to the rock-shaft D' and to the arms K', returns the latter and the arms H' to their normal vertical position out of the path of the cage, and the latter then descends in the shaft to the bottom thereof, as before.

From the foregoing description it will be readily understood that the operation of dumping the coal from the car and weighing the coal and discharging the same from the weighing-hopper is performed by a single person stationed on the platform K, thus materially reducing the expense of operating the mine.

Having thus described my invention, I claim—

1. In a pit-head and coal-dump, the combination of the cage having the pivoted bottom adapted to tilt or incline, the frame T at the upper end of the shaft, on which the cage runs when hoisted, the rock-shaft D', the rocking arms H', rigidly attached to said shaft, the arms G', extending rearwardly from the rock-shaft, the rocking levers K', pivoted to the rock-shaft and having the rearward-extending arms M', the pivoted arms N', linked to the arms G' and M', and the weights suspended from the arms N', substantially as described.

2. In a pit-head and coal-dump, the combination of the cage, the frame T at the upper end of the shaft, onto which the cage runs when hoisted, said frame being adapted to tilt, the rocking shaft D', having the crank-arm E', the rod R', connected to the said crank-arm and adapted to be operated to turn the rock-shaft, the rocking arms or levers attached to the rock-shaft and adapted to be inclined forward into the path of the cage when the rod R' is operated, and the weights to return the rock-shaft and the rocking arms or levers to their normal positions, substantially as described.

3. The combination, in the elevating-cage, of the platform having the longitudinal slot A², the slide N², movable longitudinally and secured to the platform of the cage and having the oblique diverging slots, and the yoke P², extending up through and working in the slot A², the laterally-movable sides T², having the arms engaging the oblique slots, the rock-shaft C², having the arms M², extending up through and opening in slide N² and engaging the yoke P², and the lever D², attached to the rock-shaft, substantially as described.

4. The combination, in an elevating-cage, of the slide movable longitudinally and secured to the bottom of the cage and having the oblique diverging slots, the laterally-movable sides T², having the arms engaging the said slots, the rock-shaft C², having the arm M², engaging the slide, and the lever D², attached to the rock-shaft, for the purpose set forth, substantially as described.

5. The combination of the cage, the slide movable longitudinally and secured to the bottom of the cage, said slide having the oblique diverging slots, the laterally-movable sides having the arms engaging the said slots, and the levers to actuate the slide, for the purpose set forth, substantially as described.

6. The pit-head having the tilting frame T, the elevating-cage adapted to receive the car and to run onto the frame T when hoisted, said cage having the bonnet or cover provided with the receptacle T³, for the miner's checks or tally, and the inclined converging trough P, having the hopper R, adapted to receive the contents of the receptacle T³ when the cage is tilted simultaneously with the discharge of the contents of the car in the cage, substantially as described.

7. In a pit-head and coal-dump, the combination of the track-frame T at the upper end of the shaft, adapted to tilt or incline, the cage adapted to run onto the frame when hoisted, the said cage having the hinged bottom or platform adapted to incline independently of the other parts of the cage, the rocking arms H', adapted to engage the rear end of the cage and thereby tilt the same and the frame forward when the elevating-rope slackens, the rocking arms K', adapted to simultaneously engage the bottom of the cage, for the purpose set forth, and the levers connected to the arms H' and K' to operate the same, substantially as described.

8. The cage having the vertical standards, the longitudinal bars E³, secured thereto at their upper ends, and the bonnets or covers F³, pivoted to the bars, substantially as described.

9. The cage having the pivoted locking-arms G³, provided at their outer ends with the downwardly-inclined engaging-points H³, in combination with the vertically-movable link I³, connecting the inner ends of arms G³, the chains M³, forming a bail connecting the cage to the elevating-rope, and the chains O³, connecting said chains M³ to the link I³, substantially as described.

In testimony that we claim the foregoing as our own we have hereto affixed our signatures in presence of two witnesses.

THOMAS BENTON JACKSON.
MARSHALL PIERCE LYTTON.

Witnesses:
B. F. PARNELL,
A. L. ESKRIDGE.